United States Patent
Chen et al.

(10) Patent No.: US 10,464,193 B2
(45) Date of Patent: Nov. 5, 2019

(54) TRAILER LANDING GEAR APPARATUS

(71) Applicant: Innovative Works, Inc., Santa Ana, CA (US)

(72) Inventors: Mike N. K. Chen, Irvine, CA (US); Tom Felix Casabonne, Irvine, CA (US); Daniel Torres, Jr., Anaheim, CA (US)

(73) Assignee: INNOVATIVE WORKS, INC., Santa Ana, CA (US)

( * ) Notice: Subject to any disclaimer, the term of this patent is extended or adjusted under 35 U.S.C. 154(b) by 94 days.

(21) Appl. No.: 15/199,688

(22) Filed: Jun. 30, 2016

(65) Prior Publication Data

US 2017/0001603 A1    Jan. 5, 2017

Related U.S. Application Data

(60) Provisional application No. 62/187,452, filed on Jul. 1, 2015, provisional application No. 62/315,624, filed
(Continued)

(51) Int. Cl.
| | |
|---|---|
| *B25B 21/00* | (2006.01) |
| *B25B 23/00* | (2006.01) |
| *B60S 9/08* | (2006.01) |

(52) U.S. Cl.
CPC ........ *B25B 21/002* (2013.01); *B25B 23/0078* (2013.01); *B60S 9/08* (2013.01)

(58) Field of Classification Search
CPC ...... B60S 9/02; B60S 9/00; B60S 9/08; B60S 9/12
See application file for complete search history.

(56) References Cited

U.S. PATENT DOCUMENTS 3,182,956 A    5/1965  Dalton
3,448,998 A *  6/1969  Abolins ............. B60S 9/02
                                                254/419
(Continued)

FOREIGN PATENT DOCUMENTS

| DE | 4113488 A1 * | 7/1992 | ............... B60S 9/08 |
|---|---|---|---|
| EP | 0513973 | 11/1992 | |
| JP | 2000289477 | 10/2000 | |

OTHER PUBLICATIONS

International Search Report in corresponding PCT case No. PCT/US16/040570, dated Dec. 7, 2016.

*Primary Examiner* — Tyrone V Hall, Jr.
(74) *Attorney, Agent, or Firm* — Myers Andras LLP; Joseph C. Andras

(57) ABSTRACT

A semi-trailer landing gear apparatus employing a handheld power tool is disclosed. The landing gear apparatus is attached to a standard landing gear drive shaft. The landing gear apparatus includes a slip collar drive that allows an operator to use the power tool without removing the hand crank. The power tool has a locking blade which slides into or otherwise engages with a trailer-mounted bracket or bracket mounted on a telescoping arm when the coupler is engaged, preventing rotational movement against the operator as the motor is activated. The power tool also has a quick-release socket assembly which readily connects and disconnects the power tool from the apparatus. A planetary gear system is employed for gear reduction within the power tool. The apparatus may employ a trailer-mounted motor to raise and lower the trailer landing gear.

8 Claims, 19 Drawing Sheets

Related U.S. Application Data on Mar. 30, 2016, provisional application No. 62/321,189, filed on Apr. 11, 2016.

(56) References Cited

U.S. PATENT DOCUMENTS

| | | | |
|---|---|---|---|
| 3,490,547 A | 1/1970 | Stewart | |
| 3,861,841 A | 1/1975 | Hanning | |
| 4,063,475 A | 12/1977 | Perkins | |
| 4,345,779 A | 8/1982 | Busby | |
| 4,402,526 A * | 9/1983 | Huetsch | B60S 9/08 280/766.1 |
| 4,466,637 A | 8/1984 | Nelson | |
| 5,538,225 A * | 7/1996 | VanDenberg | B60S 9/08 254/419 |
| 5,865,499 A | 2/1999 | Keyser | |
| 5,904,342 A * | 5/1999 | Laarman | B60S 9/08 16/406 |
| 5,911,437 A | 6/1999 | Lawrence | |
| 6,010,154 A | 1/2000 | Payne et al. | |
| 6,039,126 A | 3/2000 | Hseih | |
| 6,086,099 A | 7/2000 | Kingsbury | |
| 6,145,813 A * | 11/2000 | Anderson | B60S 9/08 254/418 |
| 6,218,746 B1 | 4/2001 | Gouge, Jr. | |
| 6,705,137 B2 * | 3/2004 | Saladin | B60R 25/001 70/14 |
| 6,764,065 B2 * | 7/2004 | Fox | B60S 9/02 254/103 |
| 7,097,159 B1 * | 8/2006 | Presidio | B60S 9/08 254/420 |
| 8,590,417 B1 * | 11/2013 | Bono | G05G 1/085 254/419 |
| 2004/0080125 A1 | 4/2004 | Bird et al. | |
| 2005/0073130 A1 | 4/2005 | McGlothlin | |
| 2005/0202923 A1 * | 9/2005 | Drake, III | B60S 9/08 475/269 |
| 2006/0119089 A1 | 6/2006 | Rivers et al. | |
| 2008/0164683 A1 * | 7/2008 | VanDenberg | B60S 9/08 280/766.1 |
| 2011/0012333 A1 | 1/2011 | Griffin | |

\* cited by examiner

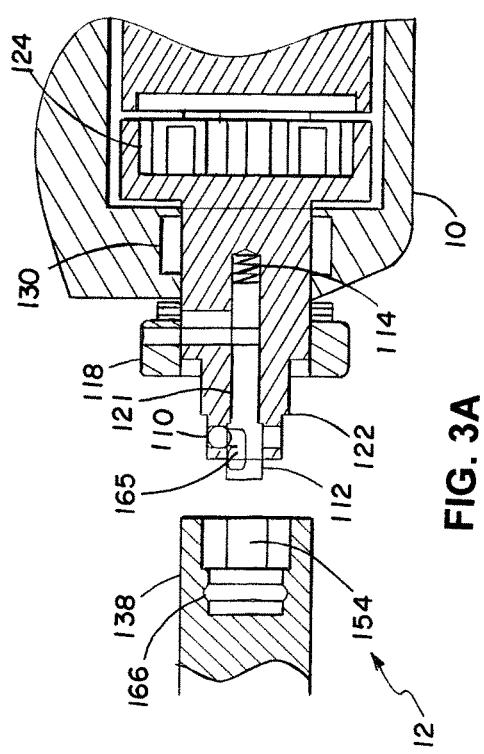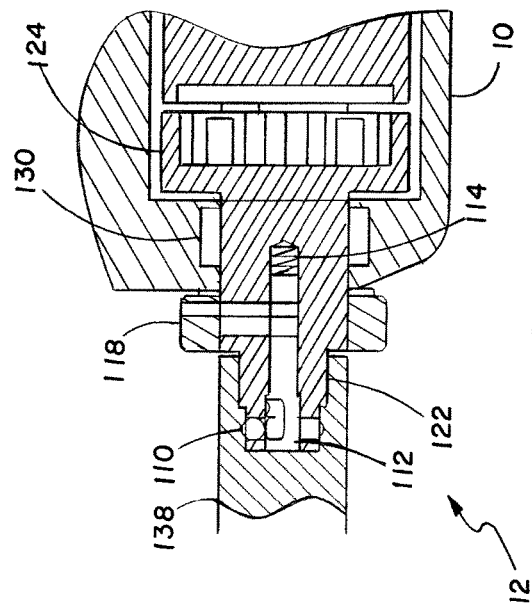
FIG. 3A
FIG. 3B

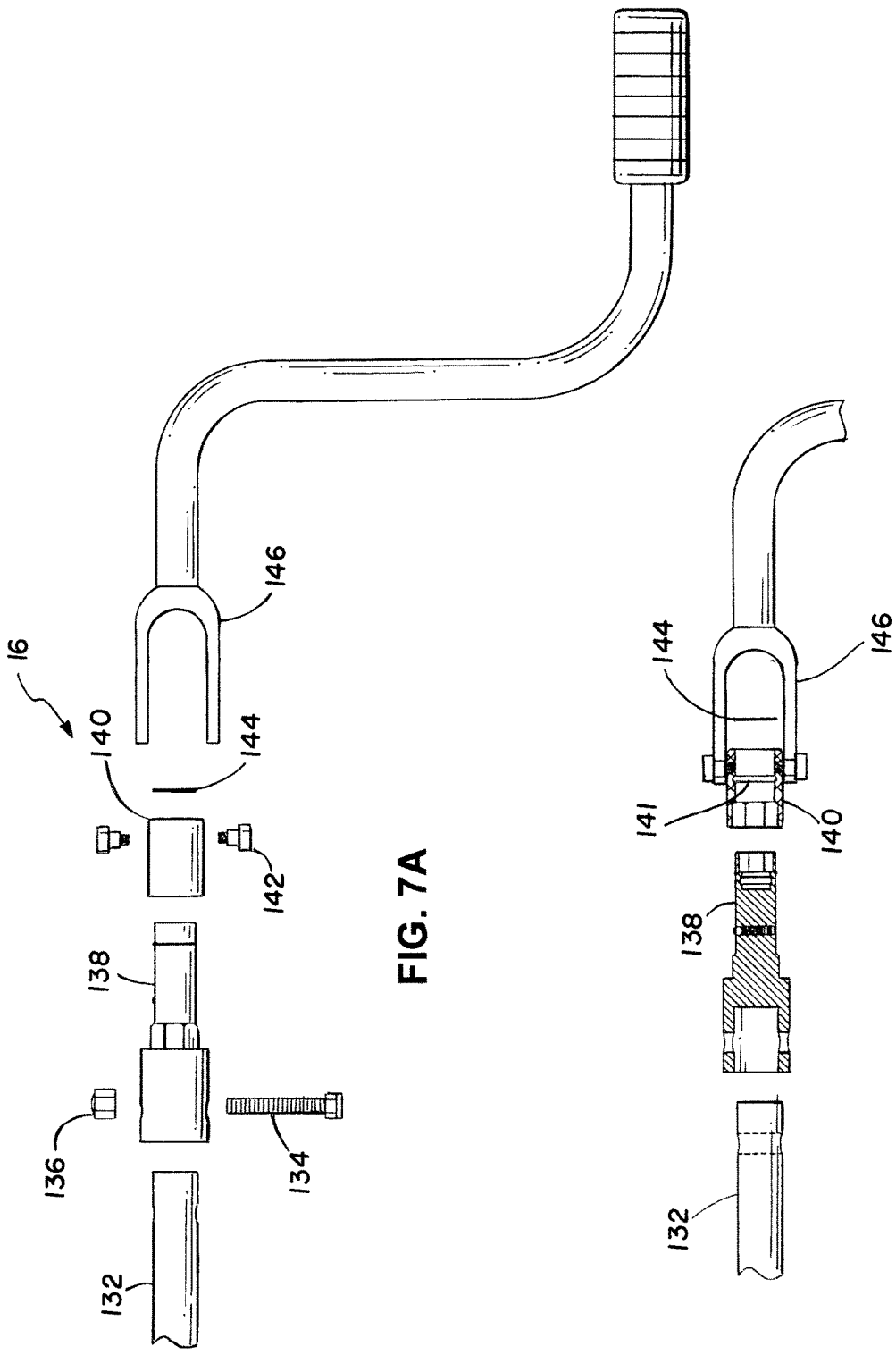

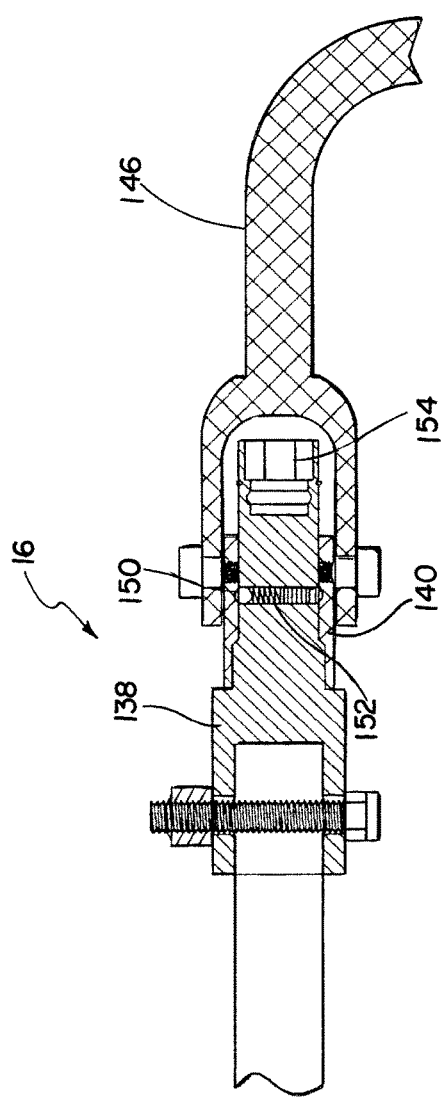
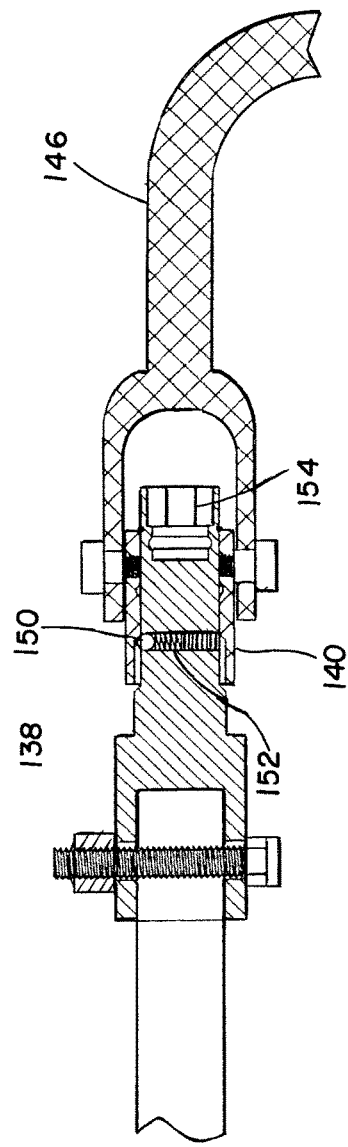
FIG. 8A — Hand Crank Engaged
FIG. 8B — Hand Crank Disengaged

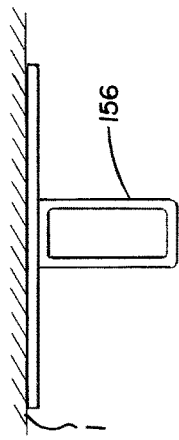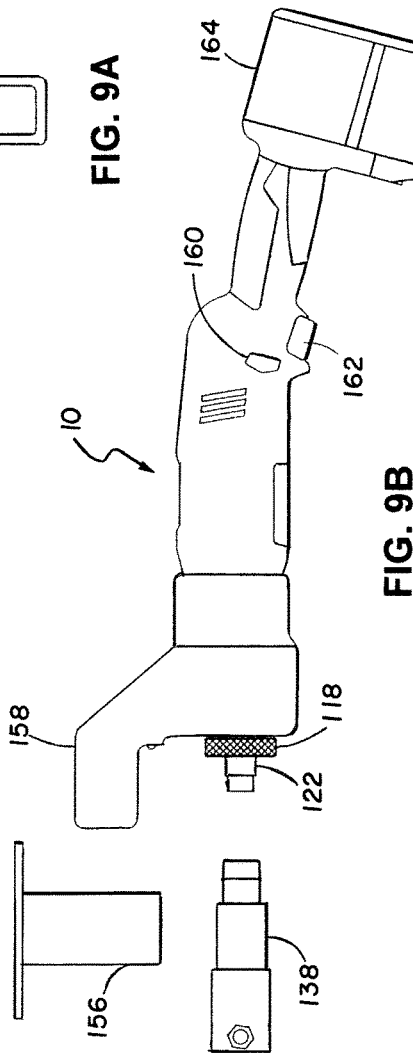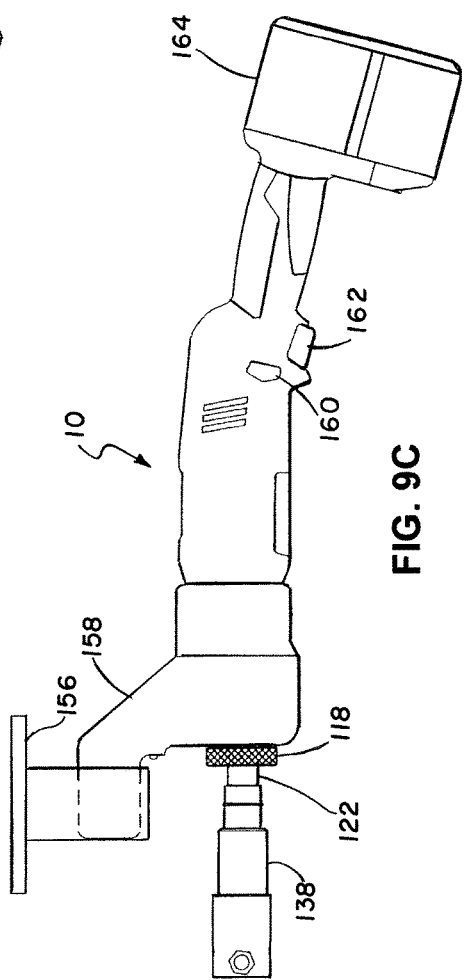

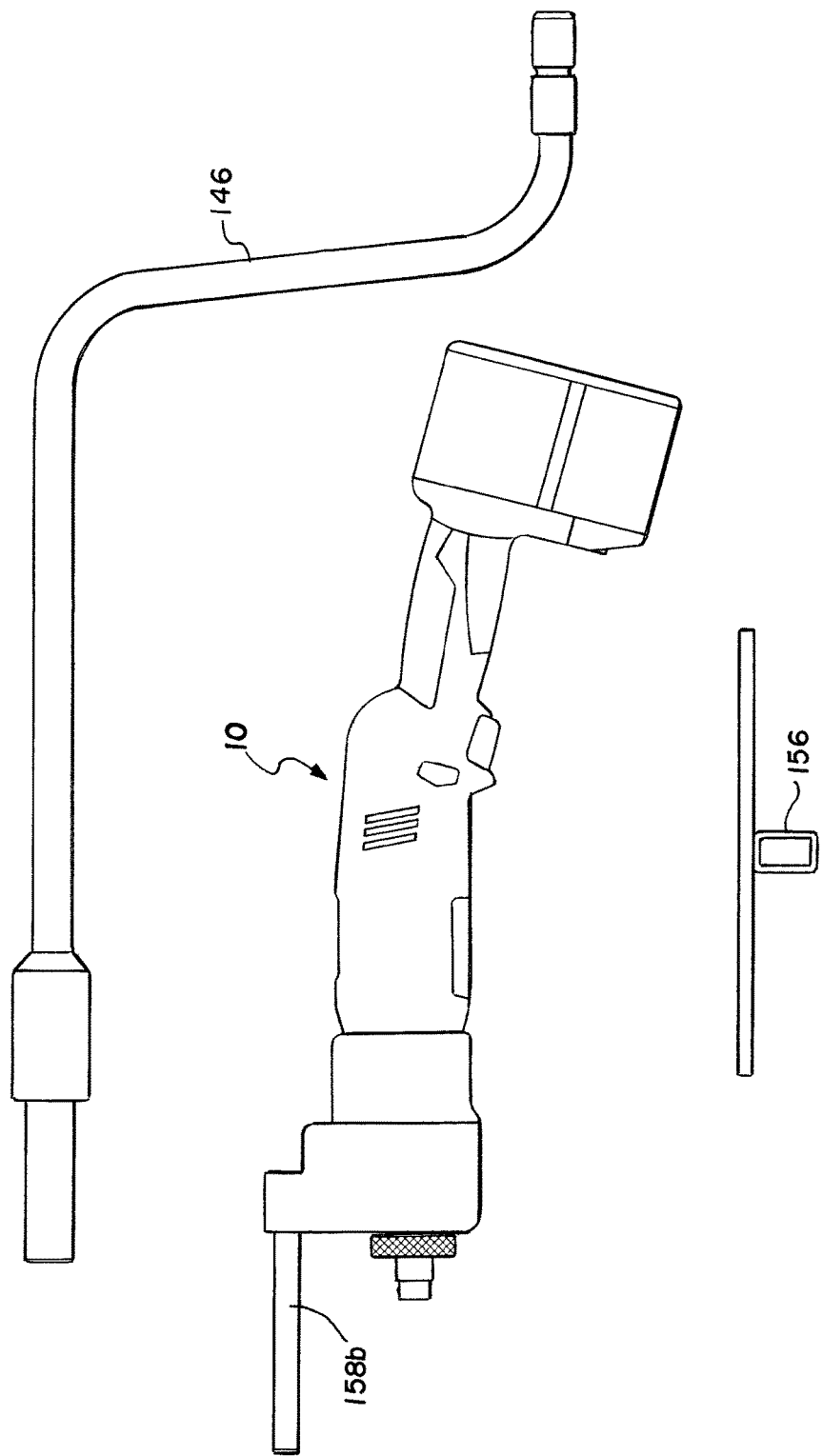

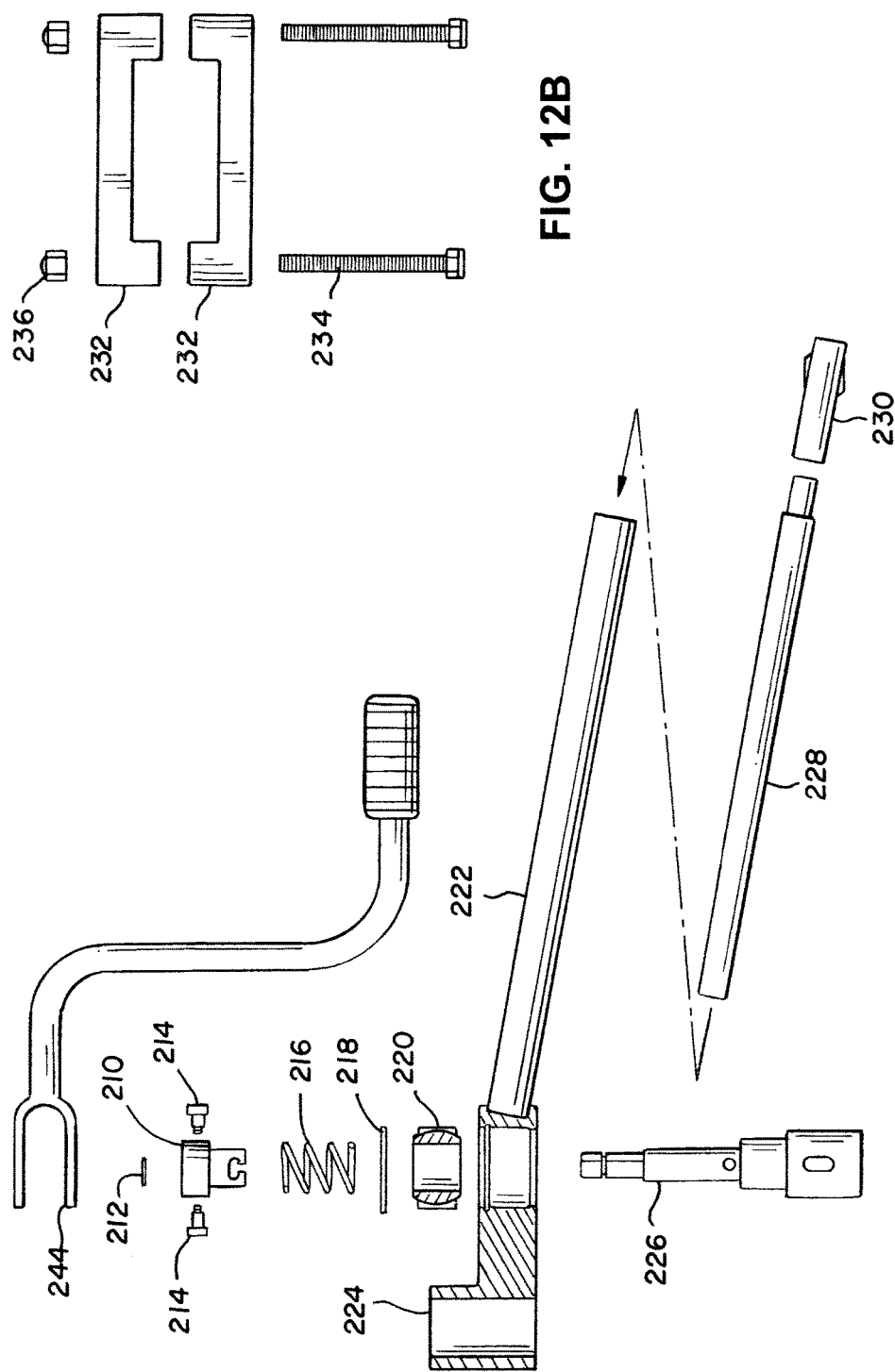

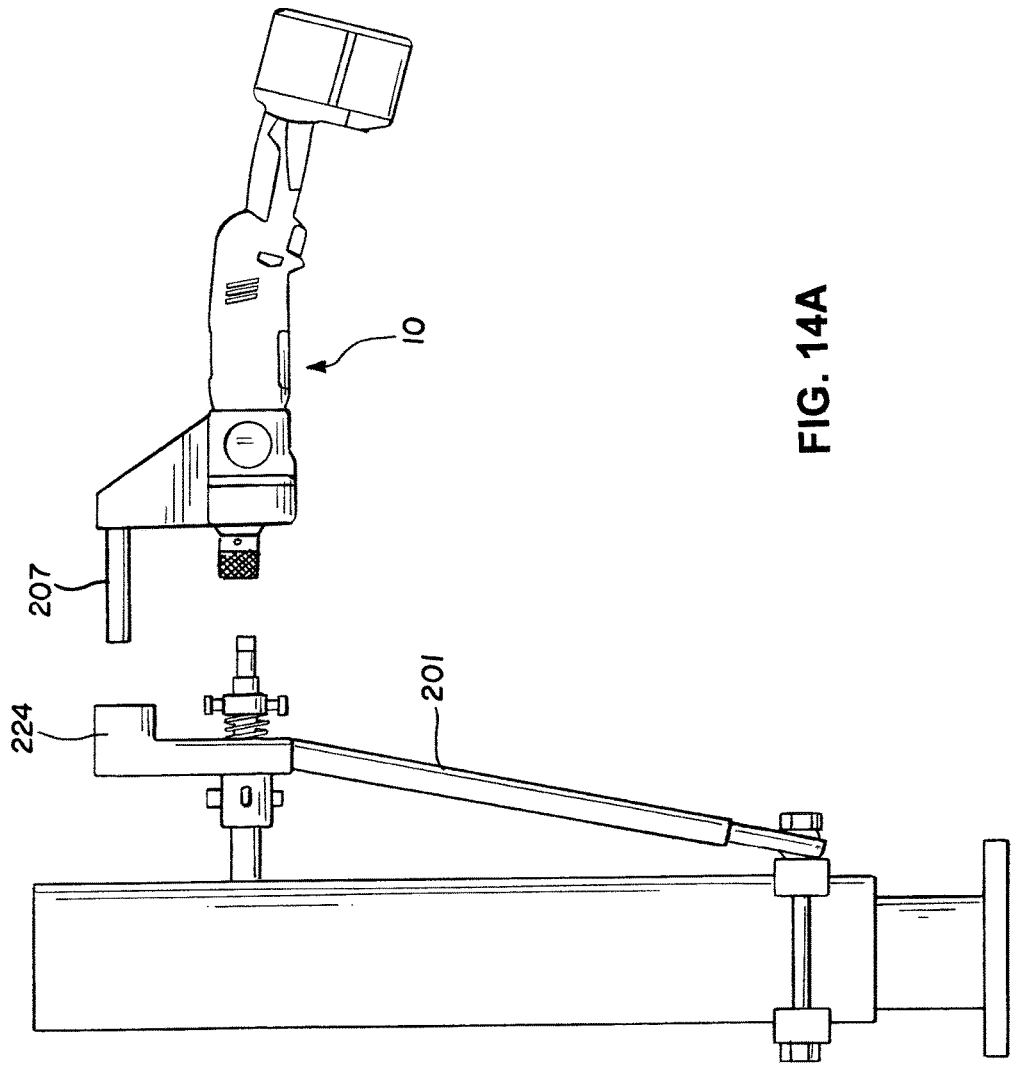

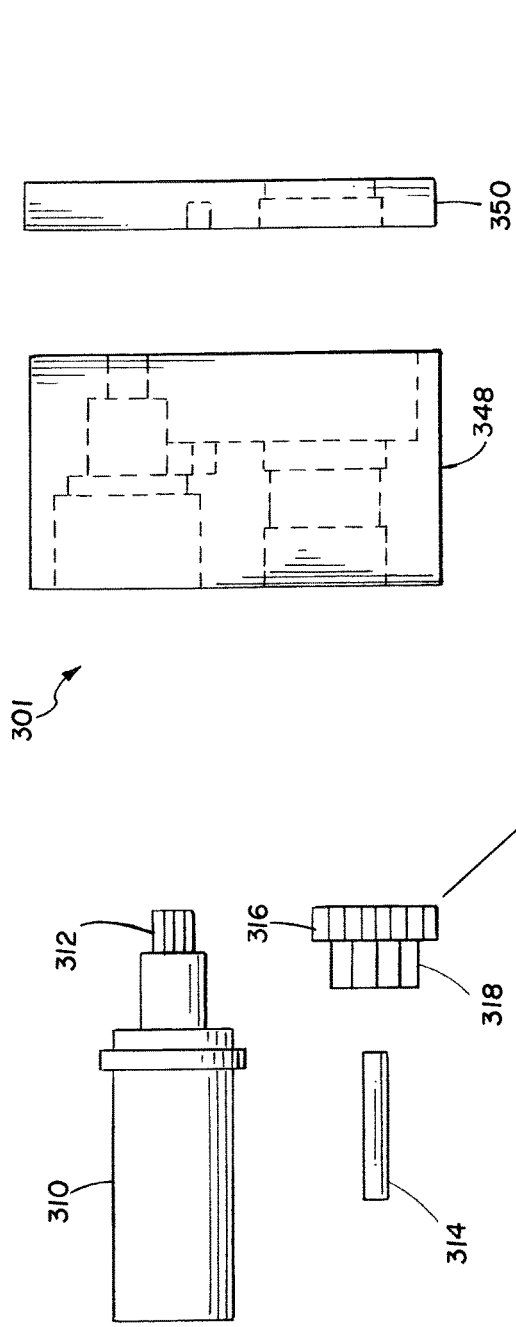
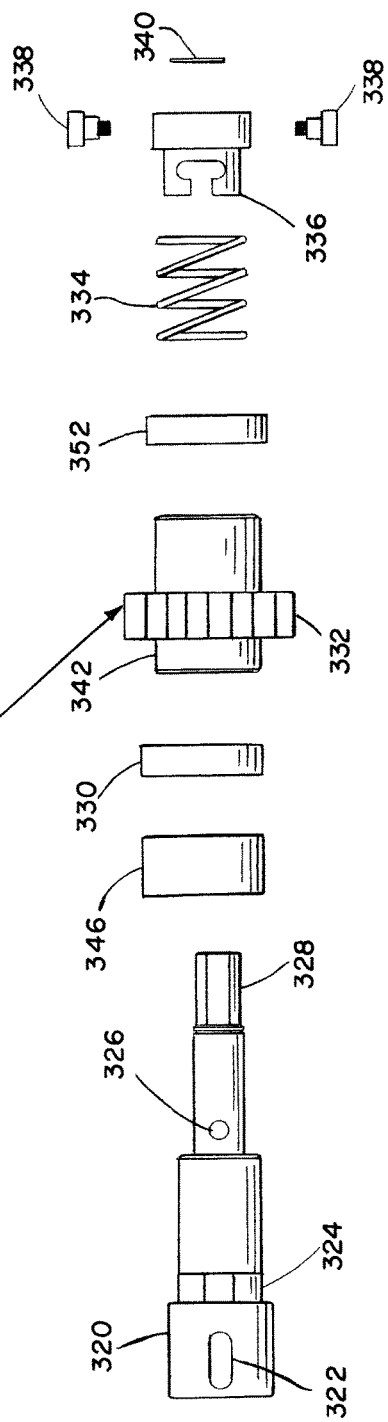
FIG. 15B
FIG. 15A

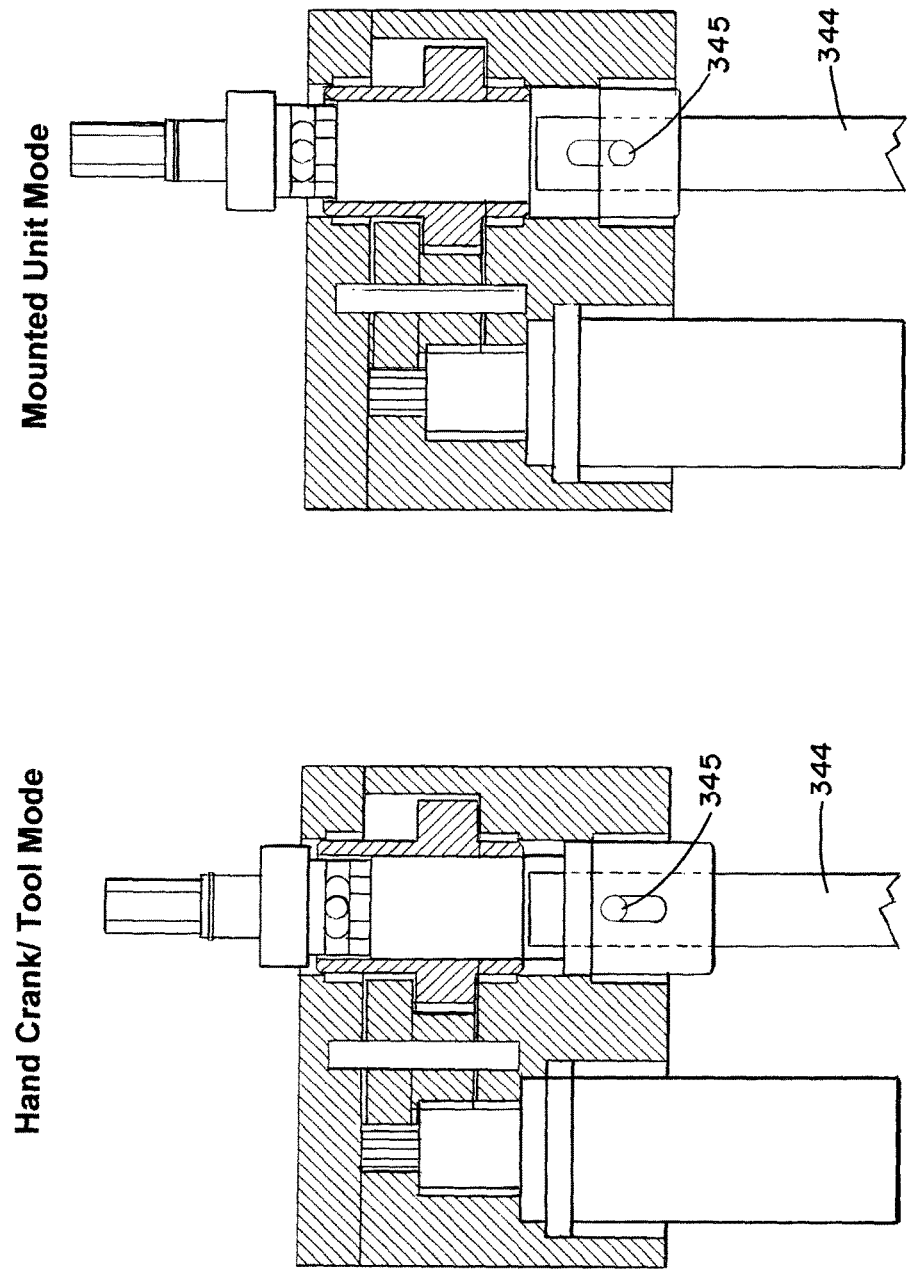

TRAILER LANDING GEAR APPARATUS

RELATED APPLICATION INFORMATION

The present application claims priority under 35 U.S.C. Section 119(e) to U.S. Provisional Patent Application Ser. No. 62/187,452 filed Jul. 1, 2015 entitled "Improved Trailer Landing Gear Apparatus," U.S. Provisional Patent Application Ser. No. 62/315,624 filed Mar. 30, 2016 entitled "Trailer-Mounted Landing Gear Apparatus," and U.S. Provisional Patent Application Ser. No. 62/321,189 filed Apr. 11, 2016 entitled "Trailer Landing Gear Universal Lift Adapter," the disclosures of which are incorporated herein by reference in their entirety.

BACKGROUND OF THE INVENTION

1. Field of the Invention

The present invention relates in general to landing gears of semi-trailers. More particularly, the invention is directed to a powered drive unit for raising or lowering landing gears.

2. Description of the Related Art

Semi-trailers typically employ a pair of landing gears at the front of the semi-trailer to support the semi-trailer when a semi-tracker is detached from the semi-trailer. The landing gear assembly usually comprises a pair of telescoping legs, a landing gear drive shaft, and a gear mechanism which cause the telescoping legs to extend or retract as the result of the rotation of the landing gear drive shaft. A truck driver usually rotates the landing gear drive shaft manually with a crank handle. However, the raising and lowering of the telescopic legs is laborious and time consuming.

Accordingly, a need exists to provide a motorized solution for operating a trailer landing gear.

SUMMARY OF THE INVENTION

In the first aspect, a trailer landing gear lifting apparatus for rotating a drive shaft of a landing gear of a land vehicle is disclosed. The apparatus comprises a slip collar drive comprising a generally cylindrical trailer bolt having a spring loaded ball bearing, a first end of the trailer bolt adapted to couple with a drive shaft of a landing gear, and a generally hollow, cylindrical hand crank drive socket, the hand crank drive socket receiving a second end of trailer bolt opposite the first end, the hand crank drive socket adapted for receiving and selectively coupling and decoupling with the trailer bolt when the ball bearing engages with hand crank drive socket. When the hand crank drive socket is coupled to the trailer bolt, the hand crank drive socket is adapted for driving the trailer bolt. When the hand crank drive socket is decoupled with the trailer bolt, the trailer bolt is configured to rotate within the stationary hand crank drive socket. The apparatus further comprises a stabilizing connector configured for coupling to a land vehicle, the stabilizing connector configured to receive and detachably secure a body of a motorized power tool from rotating during operation.

In a first preferred embodiment, the apparatus further comprises a power tool quick-release socket mechanism comprising a trailer adapter socket formed in the second end of the trailer bolt, the trailer adapter socket comprising an inner cavity with an annular groove formed in the wall of the inner cavity, and a locking pin adapted to couple with the drive shaft of a rotating power tool, the locking pin having a second spring loaded ball bearing. The trailer adapter socket is preferably configured to receive and detachably secure the locking pin when the second spring loaded ball bearing is positioned in the annular groove of the trailer adapter socket. The power tool quick-release socket mechanism preferably further comprises an engagement collar radially surrounding the locking pin and adapted to engage with the locking pin urging the ball bearing to retract from the annular groove of the trailer adapter socket. The stabilizing connector preferably comprises a trailer mounted bracket attached to the land vehicle, the trailer mounted bracket adapted to receive a locking blade of a power tool. The stabilizing connector preferably comprises a power tool engagement bracket attached to a landing gear via a telescoping torque arm, wherein the power tool engagement bracket is adapted to receive a locking blade of a power tool.

The apparatus preferably further comprises a landing gear mounting bracket adapted for attaching to the landing gear, and a swivel tie rod having a first end and a second end, the first end of the swivel tie rod is coupled to the landing gear mounting bracket, and the second end of the swivel tie rod is coupled to the telescoping torque arm. The landing gear mounting bracket preferably attaches to the landing gear via removable bolts. The apparatus preferably further comprises a swivel bearing coupling the trailer bolt to the power tool engagement bracket.

In a second aspect, a trailer landing gear lifting system for rotating a drive shaft of a landing gear of a land vehicle is disclosed. The system comprises a slip collar drive comprising a generally cylindrical trailer bolt having a spring loaded ball bearing, a first end of the trailer bolt adapted to couple with a drive shaft of a landing gear, and a generally hollow, cylindrical hand crank drive socket, the hand crank drive socket receiving a second end of trailer bolt opposite the first end, the hand crank drive socket adapted for receiving and selectively coupling and decoupling with the trailer bolt when the ball bearing engages with hand crank drive socket. When the hand crank drive socket is coupled to the trailer bolt, the hand crank drive socket is adapted for driving the trailer bolt. When the hand crank drive socket is decoupled with the trailer bolt, the trailer bolt is configured to rotate within the stationary hand crank drive socket. The system further comprises a handheld motorized power tool having a rotating drive bolt adapted for coupling to and rotating the trailer bolt, and a stabilizing connector configured for coupling to a land vehicle, the stabilizing connector configured to receive and detachably secure the body of the motorized power tool from rotating during operation.

In a second preferred embodiment, the power tool further comprises a motor having a rotating output shaft, and a planetary gear system comprising a motor spindle gear coupled to the output shaft of the motor, one or more satellite gears engaging and rotating about the motor spindle gear, and a planetary orbital ring gear formed in the drive bolt engaging and rotating about the satellite gears. The power tool preferably further comprises a locking blade offset and generally parallel with the drive bolt, the locking blade adapted to engage with the stabilizing connector. The system preferably further comprises a power tool quick-release socket mechanism comprising trailer adapter socket formed in the second end of the trailer bolt, the trailer adapter socket comprising an inner cavity with an annular groove formed in the wall of the inner cavity, and a locking pin adapted to couple with the drive shaft of a rotating power tool, the locking pin having a second spring loaded ball bearing. The trailer adapter socket is preferably configured to receive and detachably secure the locking pin when the second spring loaded ball bearing is positioned in the annular groove of the trailer adapter socket. The power tool quick-release socket mechanism preferably further comprises an engagement collar radially surrounding the locking pin and adapted to engage with the locking pin urging the ball bearing to retract from the annular groove of the trailer adapter socket. The stabilizing connector preferably comprises a trailer mounted bracket attached to the land vehicle, the trailer mounted bracket adapted to receive a locking blade of a power tool.

The stabilizing connector preferably comprises a power tool engagement bracket attached to a landing gear via a telescoping torque arm, wherein the power tool engagement bracket is adapted to receive a locking blade of a power tool. The system preferably further comprises a landing gear mounting bracket adapted for attaching to the landing gear, and a swivel tie rod having a first end and a second end, the first end of the swivel tie rod is coupled to the landing gear mounting bracket, and the second end of the swivel tie rod is coupled to the telescoping torque arm. The landing gear mounting bracket preferably attaches to the landing gear via removable bolts. The system preferably further comprises a swivel bearing coupling the trailer bolt to the power tool engagement bracket.

In a third aspect, a trailer landing gear lifting apparatus for rotating a drive shaft of a landing gear of a land vehicle is disclosed. The apparatus comprises a motor having a drive shaft, the motor mounted on a land vehicle, a gear set coupled to drive shaft of the motor, a spline socket gear coupled to the gear set, a spline socket coupled to the spline socket gear, and a power tool drive having one or more splines, the power tool drive coupled to a drive shaft of a landing gear, wherein the motor engages the drive shaft of the landing gear when the splines are moved inside the spline socket.

In a third preferred embodiment, the apparatus preferably further comprises a generally hollow, cylindrical hand crank collar, the hand crank collar receiving the power tool drive, the hand crank collar adapted for receiving and selectively coupling and decoupling with the power tool drive. When the hand crank collar is coupled to the power tool drive, the hand crank collar is preferably adapted for driving the power tool drive. When the hand crank collar is decoupled with the power tool drive, the power tool drive is preferably configured to rotate within the stationary hand crank collar.

These and other features and advantages of the invention will become more apparent with a description of preferred embodiments in reference to the associated drawings.

DESCRIPTION OF THE DRAWINGS

FIGS. 3A and 3B are cross-sectional views of a quick-release, socket mechanism before and after engagement respectively.

FIG. 7A is a side, exploded view of the portion of quick-release, socket mechanism on the trailer.

FIG. 7B is a cross-sectional side view of the assembled portion of quick-release, socket mechanism on the trailer.

FIG. 8A is cross-sectional view of the portion of quick-release, socket mechanism on the trailer, shown with the hand crank engaged.

FIG. 8B is cross-sectional view of the portion of quick-release, socket mechanism on the trailer, shown with the hand crank disengaged.

FIG. 9A is a front view of the trailer-mounted bracket.

FIG. 9B is a side view of the power tool positioned near the trailer-mounted bracket.

FIG. 9C is a side view of the locking blade of the power tool engaged into the trailer-mounted bracket.

FIG. 10 is a side view of the cordless power tool, the hand crank, and the trailer-mounted bracket.

FIG. 12A is an exploded view of the trailer landing gear universal lift adapter and a landing gear drive axle coupler.

FIG. 12B is a top view of a landing gear mounting bracket that mounts to the bottom of a landing gear leg.

FIG. 14A is a side view of the handheld power tool positioned near the landing gear universal lift adapter.

FIGS. 15A-15B are exploded views of the motor assembly with reduction gears, spline socket, and trailer axle coupler assembly.

FIG. 17A is a cross-sectional view of the trailer-mounted motor and adapter mechanism, shown in hand crank/power tool mode before engagement with the trailer-mounted motor.

FIG. 17B is a cross-sectional view of the trailer-mounted motor and adapter mechanism, shown with the trailer-mounted unit mode with the hand crank/power tool disengaged.

DETAILED DESCRIPTION OF THE PREFERRED EMBODIMENTS

Figure 1:
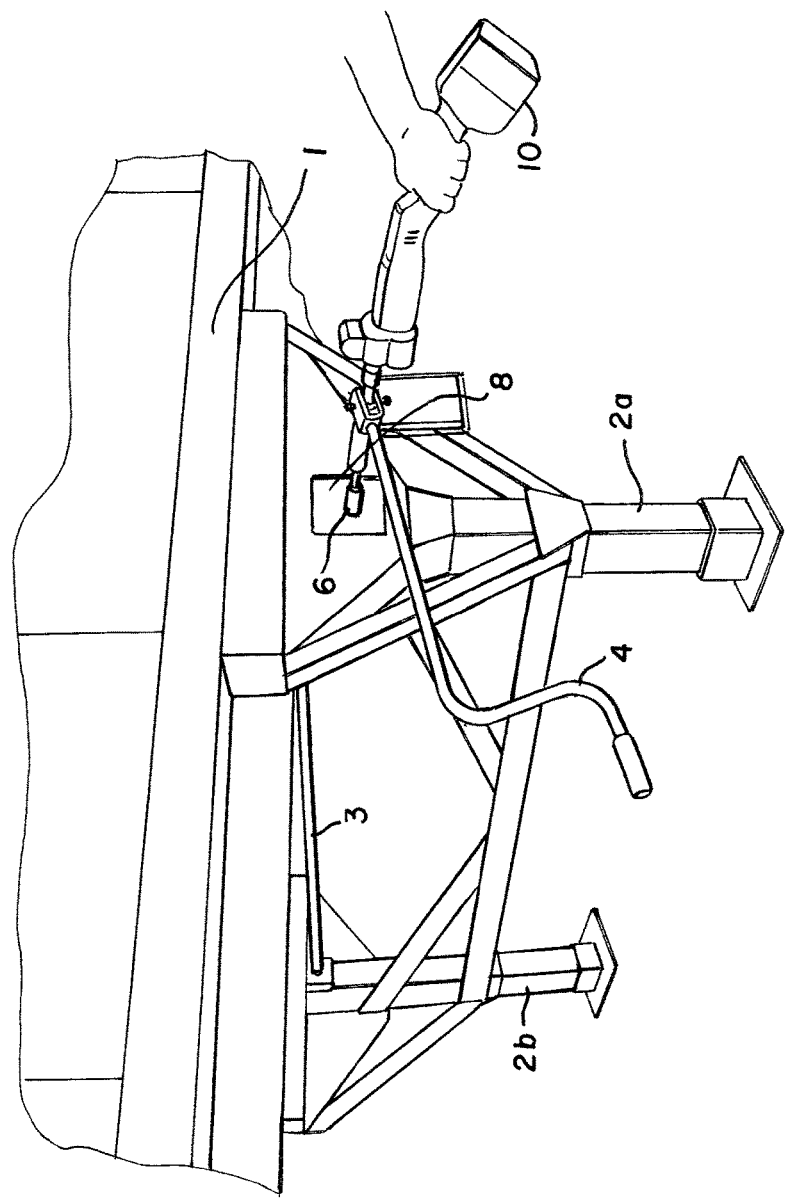
FIG. 1 is a perspective view of an operator raising the landing gear of a trailer with a handheld, cordless, power tool in one or more embodiments.

Tractor-trailers are used extensively for shipping freight across land. A tractor-trailer comprises a tractor or truck unit and a semi-trailer ("trailer") that carries freight. The trailer attaches to the truck unit such that some of the weight of the trailer is supported by the truck. Trailers typically employ a pair of landing gears at the front of the trailer to support the trailer when the tracker is detached from the trailer. The landing gear assembly usually comprises a pair of telescoping legs (i.e., landing gears), a landing gear drive shaft, and a gear mechanism which cause the telescoping legs to extend or retract in response to rotation of the landing gear drive shaft. A truck driver usually rotates the landing gear drive shaft manually with a crank handle. However, the raising and lowering of the telescopic legs is laborious and time consuming.

In one or more embodiments, a handheld, motorized power tool is employed for engaging with and rotating the landing gear drive shaft of the trailer landing gear. One or more embodiments employ a light, compact, reliable planetary gear set for gear reduction within the power tool. The preferred power tool has a locking blade which slides into or otherwise engages a trailer-mounted bracket when the coupler is engaged, preventing rotational movement against the operator as the motor is activated. The power tool also has a quick-release socket assembly which makes it easy to couple/uncouple from the trailer-mounted adapter. The trailer-mounted adapter includes a traditional hand crank which is easily engaged or disengaged with a quick-release socket assembly for use instead of the power tool. It also has a locking blade on the power tool which slides into a trailer-mounted bracket to prevent rotational movement or "kicking" against the operator during use.

In one or more embodiments a telescopic torque arm which is connected to a swivel at each end is employed. The lower swivel tie rod is anchored to the leg of the trailer landing gear by a bracket. A simple bolt or other clamping mechanism can also be used. The upper swivel fits over the landing gear drive axle coupler on the trailer. The assembly includes a power tool engagement bracket which holds the handheld power tool steady during operation. The telescoping arm and swivels make this lift adapter universally adjustable to fit on almost any trailer landing gear configuration. The trailer-mounted adapter includes a traditional hand crank which is easily engaged or disengaged with a quick-release socket assembly for use instead of the power tool. This trailer landing gear universal lift adapter prevents rotational movement or "kicking' against the operator during use. It improves on previous designs because it is easy to install on almost any trailer landing gear configuration.

One or more embodiments employ a trailer-mounted motor to raise and lower the trailer landing gear. The motor is powered by an on-board battery with a built-in recharging unit. The battery recharger works when the trailer is connected to a truck and not being used. The motor has a control panel displaying power level, main on/off power switch, and trailer up/down switch. The motor drives a gear set for gear reduction to turn a spline socket. The spline socket fits concentrically over the trailer lift axle and the trailer axle coupler. As the splines on the trailer axle coupler are moved in or out of the spline socket, the trailer-mounted landing gear apparatus is engaged or disengaged from actuating the trailer lift axle. The trailer axle coupler incorporates the hand crank/power tool adapter which can be used when the splines and spline socket are not engaged. This trailer-mounted landing gear apparatus utilizes a trailer-mounted motor for ease of operation, and the apparatus can be installed on the bottom of the trailer to minimize exposure to damage. It incorporates an adapter so operators still have the option of using a power tool or a traditional hand crank.

Teachings relating to the trailer landing gear apparatuses disclosed in U.S. patent application Ser. No. 12/928,491 filed Dec. 13, 2010 entitled "TRAILER LANDING GEAR APPARATUS" which issued as U.S. Pat. No. 8,590,417 on Nov. 26, 2013 may be employed herein and the disclosure of which is incorporated herein by reference in its entirety. The disclosure references several components or sub-systems including but not limited to a power tool, a quick-release socket mechanism, a planetary gear system, a slip collar push forward drive mechanism, a locking blade mechanism, a universal lift adapter, and a trailer mounted motor apparatus. The specific combination of components or sub-system shown in the described embodiments are exemplary and shall not be deemed limiting. All combinations of one or more of the components or sub-systems are contemplated in one or more embodiments. Moreover, embodiments depicted herein may refer to specific genders for mating between components; however, it shall be understood that the component genders described herein are for illustration purposes only and that other component genders are contemplated in one or more embodiments.

One or more embodiments relates generally to an apparatus for raising and lowering trailer landing gear and, more particularly, to an improved trailer landing gear apparatus. In a preferred embodiment, a cordless power tool and adapter for actuating the mechanism on a trailer landing gear is employed, so the landing gear can be lowered or raised with the power tool, rather than the hand crank. It uniquely engages with an adapter which is mounted onto the trailer, so the operator can still use the trailer-mounted hand crank if the power tool is unavailable.

FIG. 1 is a side, perspective view of a semi-trailer 1 having telescoping landing gears 2a and 2b. Landing gear 2a has a gear box 8 which has a protruding landing gear drive shaft 6 which may couple to a hand crank 4. Connecting rod 3 couples landing gear 2b to landing gear 2a. An operator may turn the hand crank 4 which rotates landing gear drive shaft 6. Within the gearbox 8, the rotation of the landing gear drive shaft 6 is converted to linear motion of the telescoping landing gears 2a and 2b. When the landing gear drive shaft 6 is rotated in a first direction, the landing gears 2a and 2b may extend to the ground. When landing gear drive shaft 6 is rotated in the opposite direction, the landing gears 2a and 2b may retract. In one or more embodiments, power tool 10 may be employed to engage with and rotate the landing gear drive shaft 6, relieving the operator of the laborious and time consuming tasks of manually cranking the hand crank 4.

Figure 2:
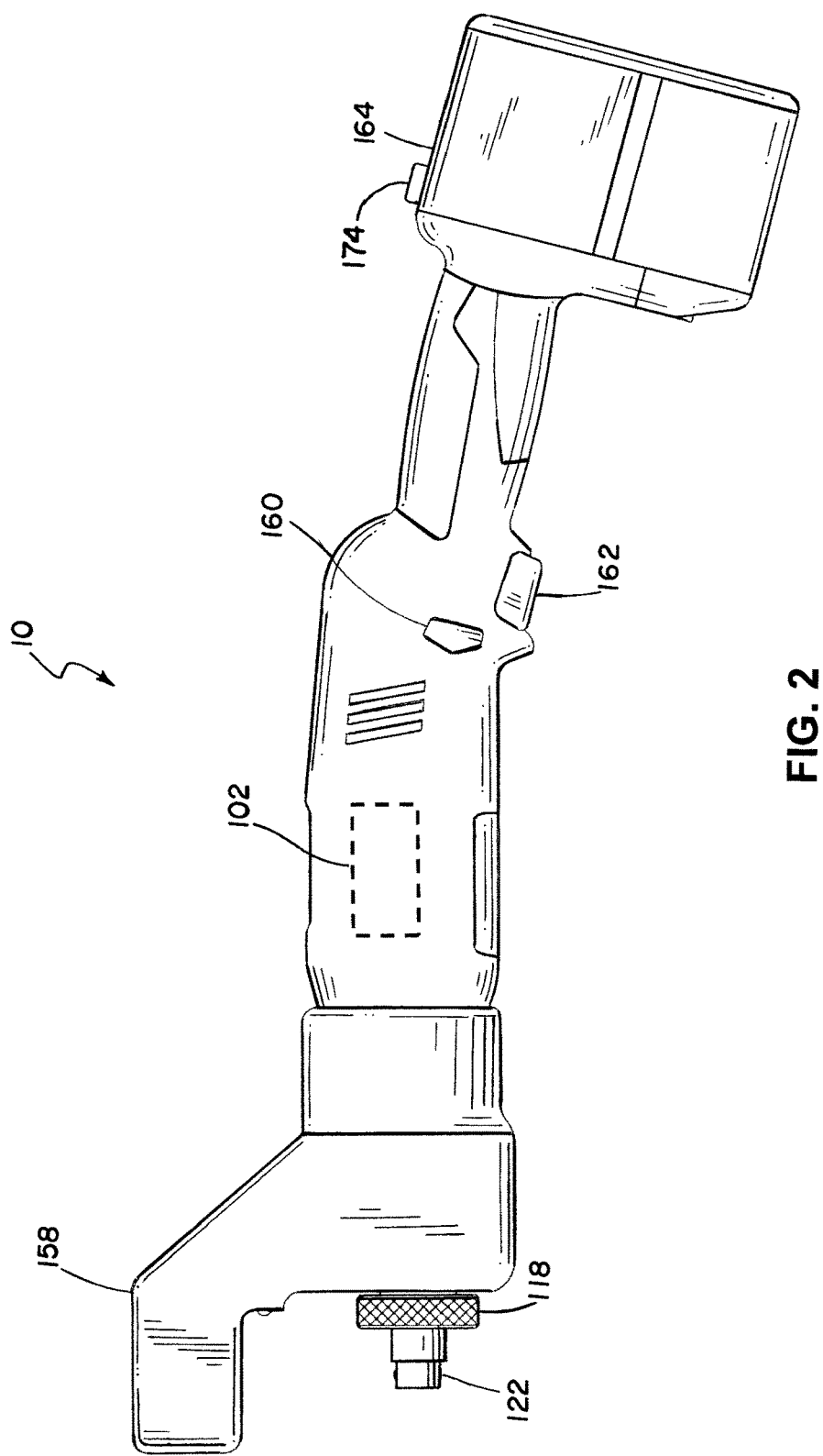
FIG. 2 is a side view of the cordless power tool.

FIG. 2 is a side view of the cordless power tool 10. The power tool 10 has an internal brushless motor 102 coupled to the drive bolt 122. When the tool trigger switch 162 is engaged, the motor 102 rotates the drive bolt 122 in either a forward (i.e., clockwise) or reverse (i.e., counterclockwise) rotational direction. As further discussed herein, when the power tool 10 is coupled to a drive shaft of a trailer and tool trigger switch 162 is depressed, the switch 162 causes the brushless motor 102 to raise (or lower) the trailer, depending on the position of the forward/reverse switch 160. The motor 102 is powered by lithium ion battery 164. The preferred battery 164 includes overload detection circuitry (not shown) that shuts off the tool in an overload state and is uniquely coupled to a manual reset button 174 that requires the operator to manually reset the power tool 10 before continuing. In other words, rather than automatically resetting as is common with battery powered tools, the reset button 174, being manual in nature, forces the operator to pause and figure out what he's doing wrong to overload the tool 10. The power tool 10 has a locking blade 158 which is placed into a secure bracket to prevent the body of the power tool 10 from rotating in reaction to the torque applied to the landing gear drive shaft 6. Engagement collar 118 is used to provide a quick-release mechanism for the power tool 10.

Figure 4:
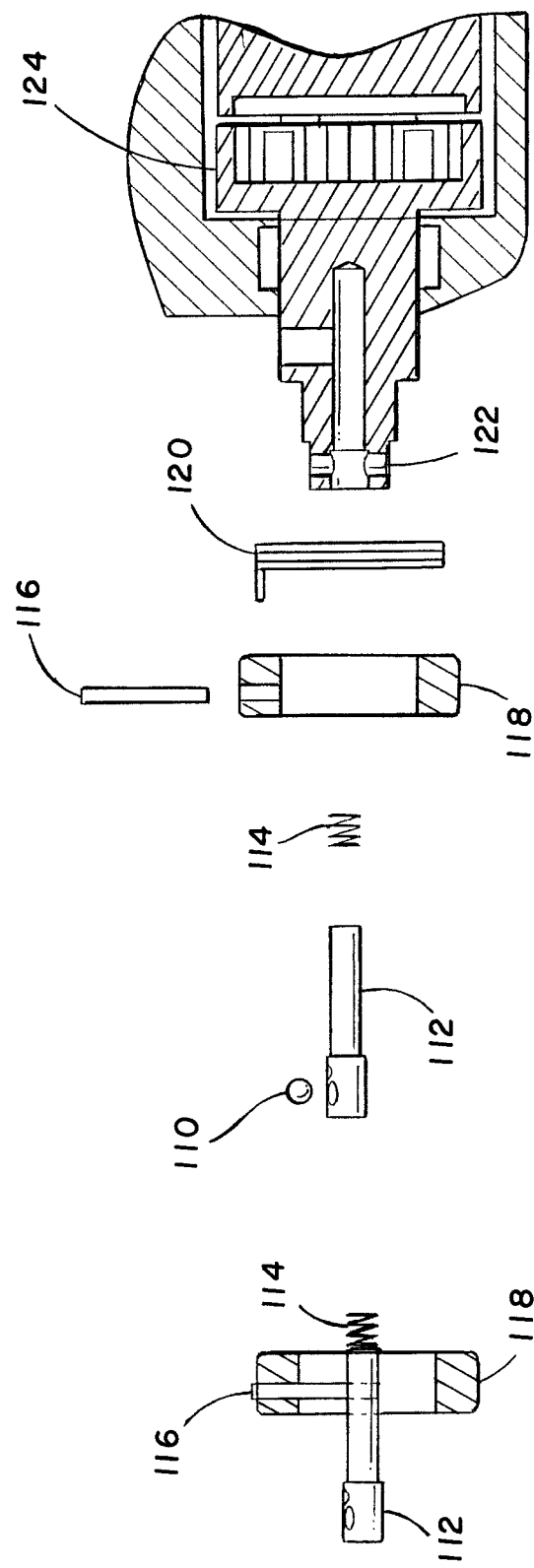
FIG. 4 is an exploded, cross-sectional view of the quick-release, socket mechanism within the power tool.
Figure 5B:
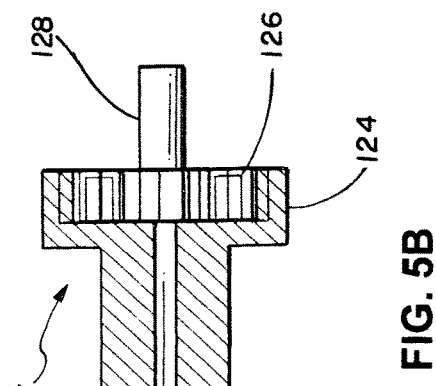
FIGS. 5A-5C are cross-sectional views of the planetary gear set that provides gear reduction from the brushless motor to the drive bolt.
Figure 5A:
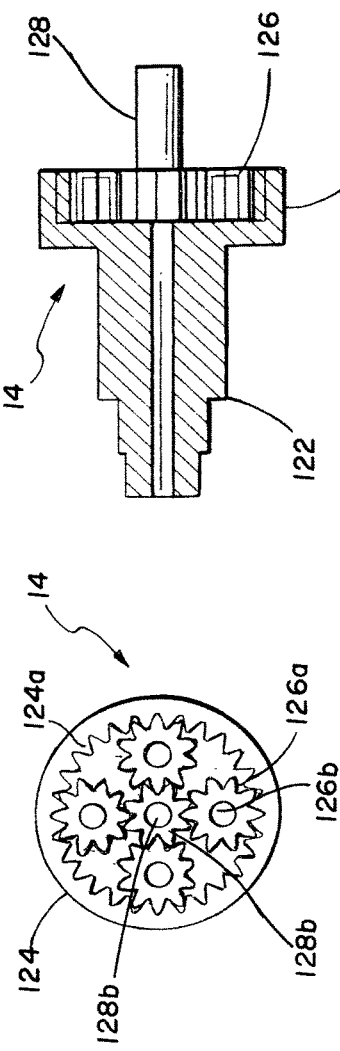
Figure 5C:
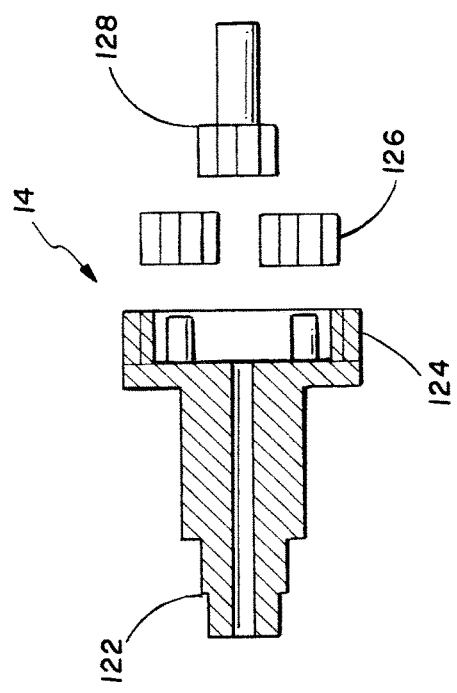

FIGS. 3A and 3B are cross-sectional views of a quick-release, socket mechanism 12, depicting a disengaged configuration with the trailer landing gear mechanism in FIG. 3A, and an engaged configuration a FIG. 3B. FIG. 4 is an exploded, cross-sectional view of the socket mechanism 12 components on the power tool 10. The quick-release socket assembly 12 comprises one or more of the following: a trailer bolt 138 having a trailer adapter socket 154 with an annular groove 166 on the inner surface of the trailer adapter socket 154 on the trailer side of the connection. The quick-release socket assembly 12 may further comprise one or more of the following: a drive bolt 122, a locking pin 112 having a groove 165, a steel ball bearing or ball 110, compression spring 114, an engagement collar 118, and a torsion spring 120 on the power tool side of the connection.

Within a cavity 121 of the drive bolt 122, a locking pin 112 is positioned with a compression spring 114 urging the locking pin 112 away from the base of the cavity 121. A steel ball 110 rests in the drive bolt 122 next to the locking pin 112. Trailer bolt 138 is coupled to the landing gear drive shaft (e.g., landing gear drive shaft 6 in FIG. 1)*of* the semi-trailer 1. The locking pin 112 has a groove 165 for holding and routing the steel ball 110, and trailer bolt 138 has a groove 166 for securing the steel ball 110 and locking drive bolt 122 in place.

One or more embodiments have a quick-release socket assembly 12 that provides a positive gun to shaft engagement with a quick-release. Embodiments employ a push-in assembly that positively locks the gun to the shaft by extending the ball 110 outward in to a groove 166 inside the trailer bolt 138. Pulling the collar 118 backward against spring 114 allows the ball 110 to fall inward to release the gun from the trailer bolt 138. Embodiments employing the "push connect" and "quick-release socket assembly" enable the operator to make a rapid connection and disconnection between the power tool 10 and quick-release socket assembly 12.

Specifically as seen in FIG. 3A, before engagement, the locking pin 112 is extended and the steel ball 110 is retracted. As the drive bolt 122 is inserted into the hexagonal trailer adapter socket 154, the locking pin 112 presses against the hexagonal trailer adapter socket 154. The locking pin 112 retracts as it pushes against compression spring 114, and as it retracts, it pushes steel ball 110 up into a groove 166 in trailer adapter socket 154 so that it is locked place. This keeps the power tool 10 engaged with trailer bolt 138 during operation, so the power tool 10 can raise or lower the trailer landing gear when energized. (FIGS. 3A, 3B, and 4 show engagement collar 118 which is held in place by torsion spring 120 pushing against spring pin 116.)

Referring to FIG. 3B, an operator may disengage the power tool 10 from trailer bolt 138 by rotating the engagement collar 118 and pushing against torsion spring 120. As engagement collar 118 is rotated, it also rotates locking pin 112 so that steel ball 110 retracts into a groove 165 on locking pin 112. With steel ball 110 retracted, the power tool 10 can be pulled out of trailer adapter socket 154 and disengaged. In one or more embodiments, the steel ball 110 may be coupled with the in the trailer adapter socket 154 where the steel ball 110 may lock into the locking pin 112.

One or more embodiments contemplate mating components with differing genders. For example, instead of the trailer bolt 138 having a female trailer adapter socket 154 and a male locking pin 112 as described herein, the trailer bolt 138 may have a male connector and the locking pin 112 may have a female connector in one or more embodiments.

FIGS. 5A-5C and 6 provide greater detail of the planetary gear system 14 having a planetary orbital ring gear 124 within power tool 10. The planetary gear system 14 comprises a motor spindle gear 128 coupled to the output shaft of the motor 102, one or more planet or satellite gears 126 engaging and rotating about the motor spindle gear 128, and a planetary orbital ring gear 124 formed in the drive bolt 122 engaging and rotating about the satellite gears 126.

Figure 6:
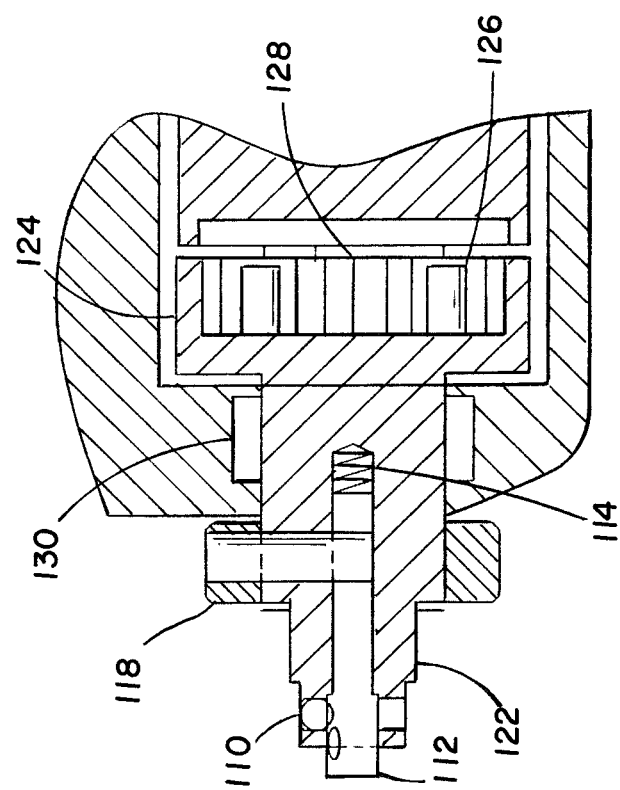
FIG. 6 is a cross-sectional view of the planetary gear set and coupler mechanism.

As depicted in FIG. 6, the planetary orbital ring gear 124 is held in the power tool 10 with roller bearing 130 and is coupled to drive bolt 122. The planetary orbital ring gear 124 has a generally hollow cylindrical cavity having a plurality of teeth 124a extending inward and toward the center axis of the orbital gear ring 124. The satellite gears 126 rotate on shafts 126b positioned between the center of the orbital ring gear 124 and the teeth 124a of the orbital ring gear 124. Motor spindle gear 128 rotates on a shaft 128b position at the center of the orbital ring gear 124. The motor spindle gear 128 is attached to the output shaft of the brushless motor 102. When the motor 102 is actuated, the motor spindle gear 128 turns against the satellite gears 126 which then turn against the planetary orbital ring gear 124, causing the drive bolt 122 to turn. The drive bolt 122 is held in place by the roller bearing 130 which is fixed to the body of the power tool 10. The planetary gear set provides gear reduction in a light, compact, strong configuration.

FIGS. 7A-7B and 8A-8B depict the features of the hand crank 146 for manually operating the landing gears for use when the power tool 10 is not available. One or more embodiments employ a slip collar push forward drive mechanism 16.

The slip collar push forward drive mechanism (i.e., slip collar drive) comprises a generally cylindrical trailer bolt 138 having a spring loaded ball bearing 150, a first end of the trailer bolt adapted to couple with a drive shaft 6 of a landing gear, and a generally hollow, cylindrical hand crank drive socket 140, the hand crank drive socket 140 receiving a second end of trailer bolt 138 opposite the first end, the hand crank drive socket 140 adapted for receiving and selectively coupling and decoupling with the trailer bolt 138 when the ball bearing 150 engages with hand crank drive socket 138. When the hand crank drive socket 140 is coupled to the trailer bolt 138, the hand crank drive socket 140 is adapted for driving the trailer bolt 138. When the hand crank drive socket 140 is decoupled with the trailer bolt 138, the trailer bolt 138 is configured to rotate within the stationary hand crank drive socket 140.

One or more embodiments allow the hand crank 146 to stay attached to landing gear drive adapter. Hand crank 146 is attached to sleeve socket 148 by shoulder screws 142. Hand crank 146 normally hangs out of the way so that access to trailer drive adapter 138 is unobstructed. If the power tool 10 is unavailable, hand crank 146 is engaged by pushing it so that sleeve socket 148 slides past steel ball 150 until the hexagonal drive socket 140 fits into place onto the hexagonal base of trailer bolt 138 as seen in FIG. 8A. It is locked in place as steel ball 150 is pushed up by compression spring 152 into a groove inside hand crank drive socket 140. When the operator is finished using the hand crank 146, it is easily disengaged by pulling until steel ball 150 retracts out of the way, allowing sleeve socket 148 to slide off of the hexagonal base of the trailer bolt 138 as seen in FIG. 8B.

One or more embodiments employ a locking blade mechanism. The power tool 10 further comprises a locking blade (e.g., locking blade 158 in FIG. 2) offset and generally parallel with the drive bolt 122, the locking blade 158 adapted to engage with the stabilizing connector. The power tool 10 has to create sufficient torque to rotate the drive shaft 6 of the landing gear, which may also generate a reactionary torque to the outer body of the power tool 10. One or more embodiments provide a locking blade mechanism for detachably securing the power tool 10 to prevent reactionary rotation of the tool 10.

FIGS. 9A-9C show the power tool 10 engaged with a trailer-mounted bracket 156 to prevent the power tool 10 from rotating while in use. FIG. 9A shows the trailer-mounted bracket 156 affixed to the underside of the semi-trailer 1. The trailer-mounted bracket 156 may bolted or welded to the semi-trailer 1. FIG. 9B shows the power tool 10 just before engaging with the trailer-mounted bracket 156 and the trailer bolt 138. FIG. 9C shows the operator coupling the power tool 10 to the semi-trailer landing gear assembly. Power tool 10 has a "proboscis" or locking blade 158 which enters the trailer-mounted bracket 156 when the drive bolt 122 engages with the trailer bolt 138. When engaged, the trailer-mounted bracket prevents the body of the power tool 10 from rotating when the motor 102 is actuated. In one or more embodiments, the locking blade mechanism comprises the trailer-mounted bracket 156 and the locking blade 158 on the power tool 10.

FIG. 10 is a side view of the cordless power tool 10, the hand crank 146, and the trailer mounted bracket 156. In one or more embodiments, the power tool 10 has a cylindrically shaped locking blade 158b.

One or more embodiments relates generally to an apparatus for raising and lowering trailer landing gear and, more particularly, to an improved adapter for operating a hand-held motorized trailer landing gear apparatus. In a preferred embodiment, a universal lift adapter which can be installed on almost any trailer is employed, and which takes the torque reaction force away from the operator's hands, reducing repetitive strain injuries. The adapter is designed so the operator can still use the trailer-mounted hand crank if the hand-held power tool 10 is unavailable.

Figure 11B:
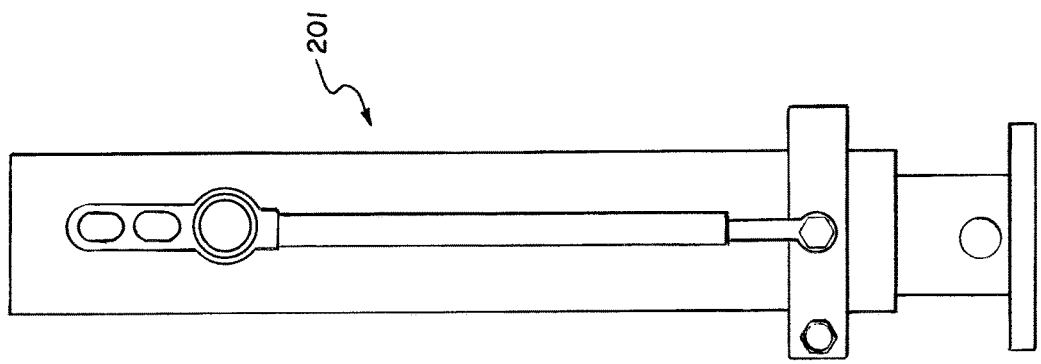
FIG. 11B is a front view of a universal lift adaptor attached to a landing gear.
Figure 11A:
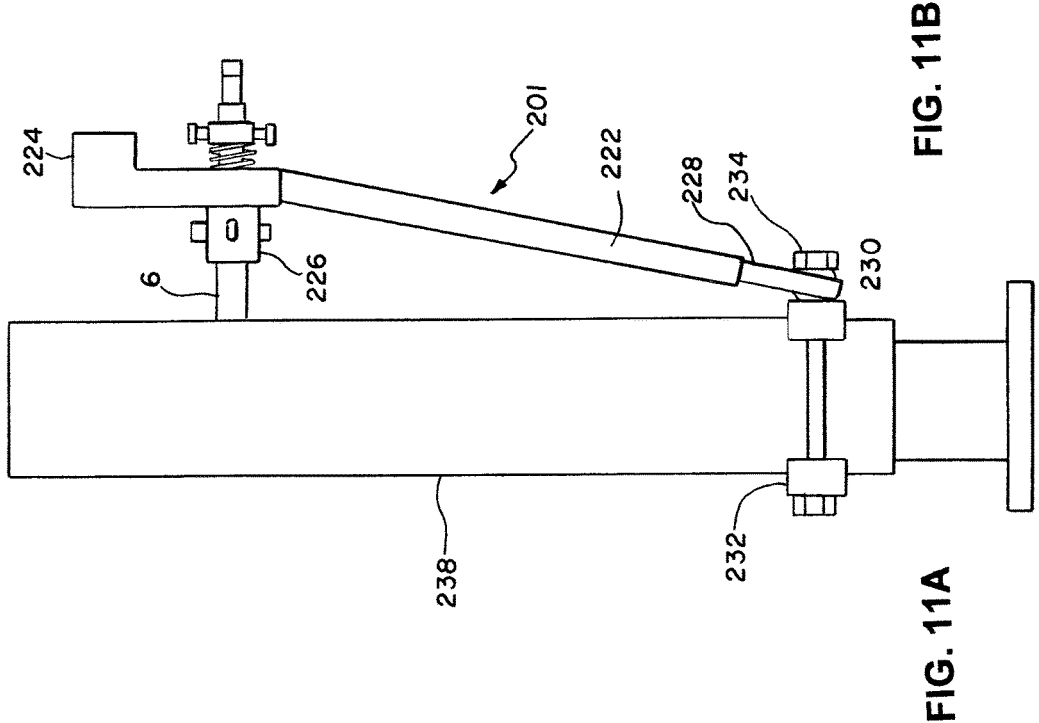
FIG. 11A is a side view of a universal lift adaptor attached to a landing gear.

More specifically, FIGS. 11A and 11B are the side and front views respectively of a universal lift adapter 201 in one or more embodiments. The universal lift adapter 201 comprises one or more of the following: a landing gear mounting bracket 232, a swivel tie rod 230, telescoping torque arm comprising a engagement bracket extension arm 228 and adapter arm 222, a power tool engagement bracket 224, landing gear drive axle coupler 226, a swivel bearing 220 (see FIG. 12A), a bearing retaining clip 218, a spring 216, a hand crank connector 210, and a retaining clip 212.

A landing gear mounting bracket 232 is affixed to the landing gear 238 by hex bolts 234. A swivel tie rod 230 couples the engagement bracket extension arm 228 to the landing gear mounting bracket 232 and allows the engagement bracket extension arm 228 to pivot away and rotate with respect to the landing gear assembly 238. An adapter arm 222 receives the engagement bracket extension arm 228 and supports the power tool engagement bracket 224. The engagement bracket extension arm 228 slides inside of adapter arm 222, functioning together as a telescoping torque arm. Adapter arm 222 is connected to power tool engagement bracket 224, which fits over swivel bearing 220 and mounts to landing gear drive axle coupler 26, which is mounted to the trailer. The power tool engagement bracket 224 has a landing gear drive axle coupler 226 which is attached to the landing gear drive shaft 6.

FIGS. 12A and 12B are exploded details of the universal lift adapter 201. FIG. 12B shows the landing gear mounting brackets 232 coupling together through hex bolts 234 and hex nuts 236. As shown in FIG. 12A, the swivel tie rod 230 is coupled to the engagement bracket extension arm 228, which is in turn received by adapter arm 222. The adapter arm 222 is coupled to the power tool engagement bracket 224. The landing gear drive axle coupler 226 is positioned through the power tool engagement bracket 224 through a swivel bearing 220 which allows the coupler 226 to pivot with respect to the engagement bracket 224. The landing gear drive axle coupler 226 receives a bearing retaining clip 218, a spring 216, a hand crank connector 210 having shoulder screws 214, and a retaining clip 212. FIG. 12A also illustrates hand crank 244. FIG. 12A shows the adapter mounted to landing gear 238. As shown, the swivels and telescoping arms make the adapter universally adjustable.

Figure 13A:
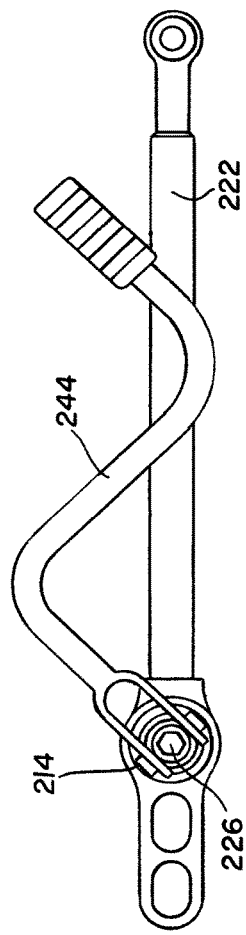
FIGS. 13A and 13B are top and side views of the hand crank coupling to the universal lift adaptor.
Figure 13B:
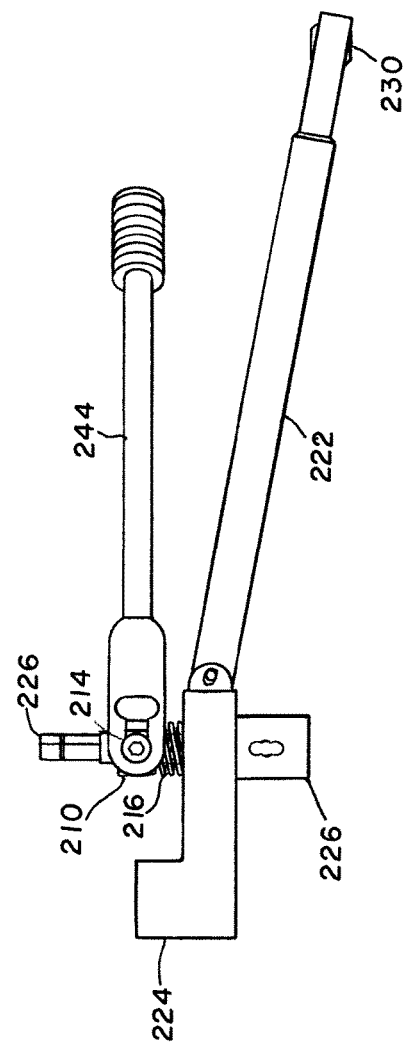

FIGS. 13A and 13B show how the adapter fits over landing gear drive axle coupler 226. Swivel tie rod 230 and swivel bearing 220 make the telescoping engagement bracket extension arm 228 and adapter arm 222 adjustable for almost any trailer landing gear configuration. Also shown is hand crank connector 210 which allows a traditional hand crank 244 to be used when a hand-held power tool is not available.

Figure 14B:
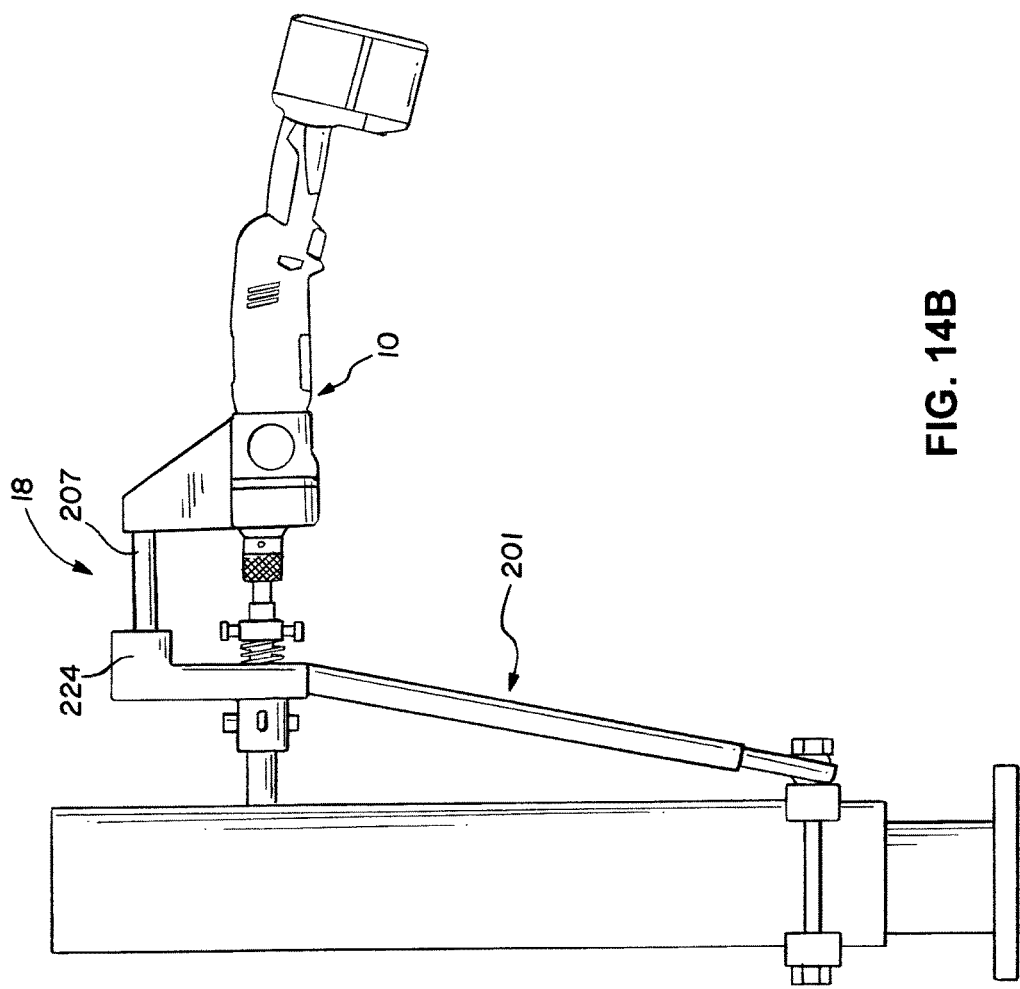
FIG. 14B is a side view of the handheld tool engaged with the landing gear universal lift adapter.

FIG. 14A shows the hand-held power tool 10 disengaged, which would permit hand crank 244 to be used. FIG. 14B shows the hand-held power tool 10 engaged with the adapter 201. A protuberance (i.e., locking blade) 207 from the tool 10 fits into power tool engagement bracket 224 to hold it steady and take torque reaction force away from the operator's hands. In one or more embodiments, the locking blade mechanism comprises the locking blade 207 and the power tool engagement bracket 224.

One or more embodiments relates generally to a motorized apparatus for raising and lowering trailer landing gear and, more particularly, to a trailer-mounted landing gear apparatus. In a preferred embodiment, the trailer landing gear can be lowered or raised with the motor is employed, rather than the hand crank or a hand-held power tool. The motor uniquely engages with an adapter which is mounted onto the trailer, so the operator can still use the trailer-mounted hand crank or a power tool if the trailer mounted apparatus is not operable.

Figure 16:
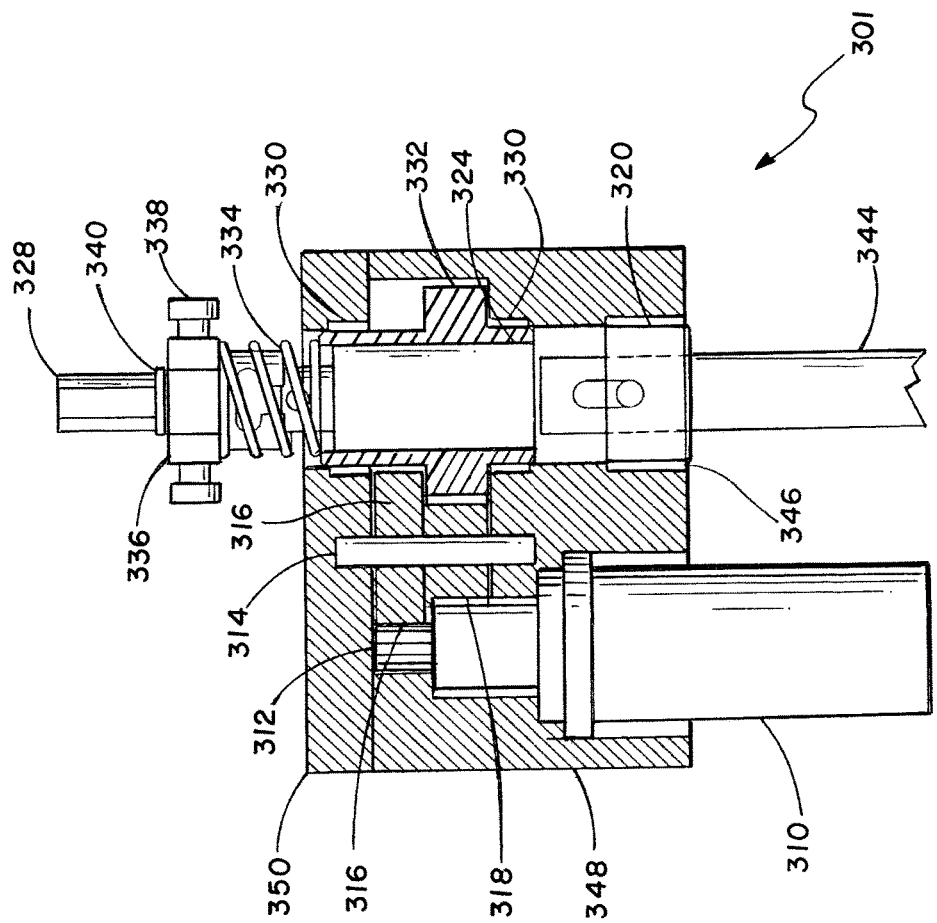
FIG. 16 is a tope, cross-sectional view of a gear set that provides gear reduction from the motor to the spline socket.

FIGS. 15-17 are directed to one or more embodiments employing a trailer-mounted motor apparatus 301 to raise and lower the trailer landing gear 2a/2b. The motor is powered by an on-board battery with a built-in recharging unit. The battery recharger works when the trailer is connected to a truck and not being used. The motor has a control panel displaying power level, main on/off power switch, and trailer up/down switch. The motor drives a gear set for gear reduction to turn a spline socket. The spline socket fits concentrically over the trailer lift axle and the trailer axle coupler. As the splines on the trailer axle coupler are moved in or out of the spline socket, the trailer-mounted landing gear apparatus is engaged or disengaged from actuating the trailer lift axle. The trailer axle coupler incorporates the hand crank/power tool adapter which can be used when the splines and spline socket are not engaged.

As depicted in FIGS. 15A, 15B, and 16, the trailer-mounted motor apparatus 301 comprises one or more of the following: a gear motor assembly 310, a pinion gear 312, a torque multiplication gear 316, a spline socket gear 332, a trailer bolt bushing 346, a spline 324, a hand crank collar 336, and shoulder screws 336 in one or more embodiments.

FIG. 15A shows a motor pinion gear 312 which is attached to the output shaft of the motor 310. When the motor 310 is actuated, the motor pinion gear 312 turns against torque multiplication gear 316, so that torque multiplication gear 318 turns against spline socket gear 332. Torque multiplication gears 316 and 318 are held in place by idler shaft 314. Spline socket gear 332 is mounted to the outside of spline socket 342, which is held in place by bushings 330 and 352. FIG. 15B shows the gear box housing 348 and gear box cap 350 for holding the components.

FIGS. 17A-18B show the trailer lift axle 344 which always turns with the trailer bolt assembly because of the pin 345 mounted to the trailer lift axle 344. The pin 345 slides inside of engagement positioning slot 22 as the trailer axle coupler 20 is moved axially in and out of spline socket 342. When splines 324 are moved inside of spline socket 342, the trailer axle coupler 320 turns with the spline socket 342 if the motor 310 is actuated. This turns the trailer lift axle 344 to raise or lower the landing gear, depending on which motor setting is selected. When splines 324 are moved out of spline socket 342, the trailer axle coupler 320 turns freely inside of spline socket 342 and the motor 310 is disengaged from the trailer landing gear mechanism. The trailer landing gear can be raised or lowered by a traditional hand crank 4 or power tool 10 on the end of the trailer bolt assembly.

Figure 18A:
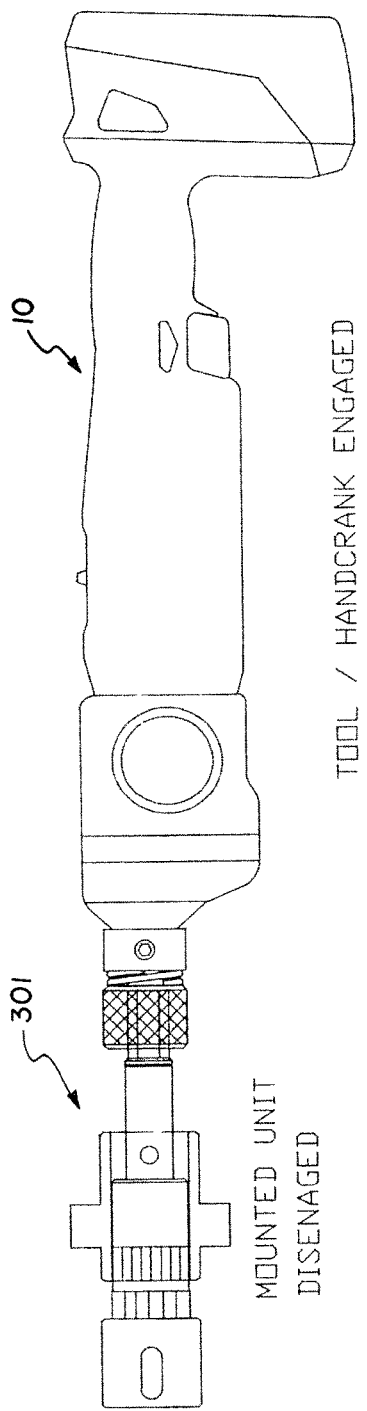
FIG. 18A is a side view of the cordless power tool shown in hand crank/power tool engaged with the trailer-mounted motor.
Figure 18B:
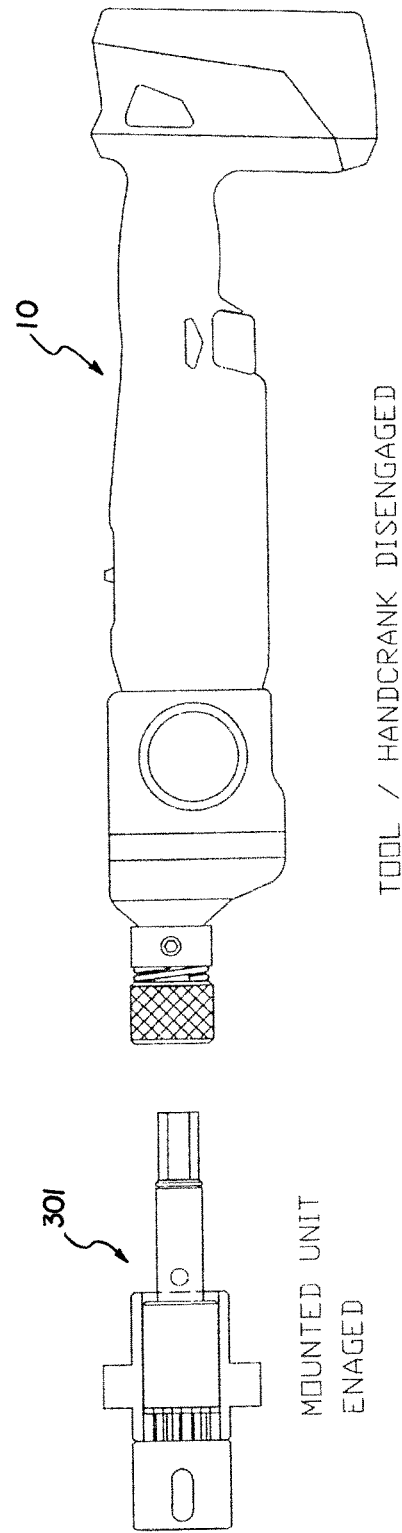
FIG. 18B is a side view of the cordless power tool shown in hand crank/power tool disengaged with the trailer-mounted motor.

FIG. 18A is a side view of the cordless power tool shown in hand crank/power tool engaged with the trailer-mounted motor. FIG. 18B is a side view of the cordless power tool shown in hand crank/power tool disengaged with the trailer-mounted motor.

Although the invention has been discussed with reference to specific embodiments, it is apparent and should be understood that the concept can be otherwise embodied to achieve the advantages discussed. The preferred embodiments above have been described primarily as motorized apparatuses for raising and lowering landing gears for semi-trailers. In this regard, the foregoing description of the motorized apparatuses is presented for purposes of illustration and description.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

REFERENCE LABEL LIST

Item Description
1 Semi-trailer (body)
2a/2b Landing Gears
3 Connecting Rod
4 Hand Crank
6 Landing Gear Drive Shaft
8 Gear Box
10 Power Tool (motorized, handheld)
12 Quick-Release, Socket Mechanism
14 Planetary Gear System
16 Slip Collar Push Forward Drive Mechanism
18 Locking blade mechanism
102 Motor
110 5 mm steel ball (quick-release socket)
112 Locking pin
114 Compression spring (quick-release socket)
116 Spring pin
118 Engagement collar
120 Torsion spring
122 Drive bolt
124 Planetary orbital ring gear
126 Satellite gears
128 Motor spindle gear
130 Roller bearing
132 Trailer lift axle
134 Lock screw
136 Locking nut
138 Trailer bolt
140 Hand crank drive socket
142 Shoulder screw
144 Retaining clip
146 Hand crank
148 Hand crank sleeve socket
150 5 mm steel ball (hand crank sleeve)
152 Compression spring (hand crank sleeve)
154 Trailer adapter socket
156 Trailer-mounted bracket
158 Locking blade
160 Forward/reverse switch
162 Tool trigger switch
164 Lithium ion battery
165 Groove (in pin 112)
166 Annular groove (in socket 154)
174 Manual Reset Button
201 Universal lift adapter
207 Protuberance (locking blade)
210 Hand Crank Connector
212 Retaining Clip
214 Shoulder Screw
216 Spring
218 Bearing Retaining Clip
220 Swivel Bearing
222 Adapter Arm
224 Power Tool Engagement Bracket
226 Landing Gear Drive Axle Coupler
228 Engagement Bracket Extension Arm
230 Swivel Tie Rod
232 Landing Gear Mounting Bracket
234 Hex Bolt
236 Hex Nut
238 Landing Gear Assembly
240 Universal Power Tool Engagement Bracket
242 Landing Gear Axle
244 Hand Crank
301 Trailer mounted motor apparatus
310 Gear motor assembly
312 Pinion Gear
314 Idler shaft
316 Torque multiplication gear
318 Torque multiplication gear
320 Trailer axle coupler
322 Engagement positioning slot
324 Spline
326 Hand crank engagement pin
328 Power tool drive
330 Rear bushing
332 Spline socket gear
334 Hand crank spring
336 Hand crank collar
338 Shoulder screw
340 Retaining clip
342 Spine socket
344 Trailer lift axle
345 Pin
346 Trailer bolt bushing
348 Gear box housing
350 Gear box cap
352 Front bushing

What is claimed is:

1. A trailer landing gear lifting apparatus for rotating a drive shaft of a landing gear of a land vehicle, comprising:
a slip collar drive comprising:
a generally cylindrical trailer bolt, a first end of the trailer bolt adapted to couple with the drive shaft of the landing gear, and
a generally hollow, cylindrical hand crank drive socket, the hand crank drive socket receiving a second end of the trailer bolt opposite the first end, the hand crank drive socket adapted for receiving and selectively coupling and decoupling a hand crank with the trailer bolt, wherein:
when the hand crank drive socket is coupled to the trailer bolt, the hand crank drive socket is adapted for driving the trailer bolt, and
when the hand crank drive socket is decoupled with the trailer bolt, the trailer bolt is configured to rotate relative to the hand crank drive socket;
a stabilizing connector configured for coupling to the land vehicle, the stabilizing connector configured to receive and detachably secure a body of a motorized power tool from rotating during operation;
a landing gear mounting bracket that is affixed to the landing gear and is adapted for attaching the stabilizing connector to the landing gear to prevent the motorized power tool from rotating during operation; and
a telescoping torque arm attached to the landing gear mounting bracket, wherein the stabilizing connector comprises a power tool engagement bracket attached to the landing gear via the telescoping torque arm and the landing gear mounting bracket, and wherein the power tool engagement bracket is adapted to receive a locking blade of the power tool.

2. The trailer landing gear lifting apparatus for rotating the drive shaft of a landing gear of a land vehicle of claim 1, further comprising:
a swivel tie rod having a first end and a second end, the first end of the swivel tie rod is coupled to the landing gear mounting bracket, and the second end of the swivel tie rod is coupled to the telescoping torque arm.

3. The trailer landing gear lifting apparatus for rotating the drive shaft of a landing gear of a land vehicle of claim 2, wherein the landing gear mounting bracket attaches to the landing gear via removable bolts.

4. The trailer landing gear lifting apparatus for rotating the drive shaft of a landing gear of a land vehicle of claim 1, further comprising a swivel bearing coupling the trailer bolt to the power tool engagement bracket.

5. A trailer landing gear lifting system for rotating a drive shaft of a landing gear of a land vehicle, comprising:
a slip collar drive comprising:
a trailer bolt coupled with a drive shaft of the landing gear, and
a hand crank drive socket adapted for receiving and selectively coupling and decoupling a hand crank with the trailer bolt, wherein
when the hand crank drive socket is coupled to the trailer bolt, the hand crank drive socket is adapted for driving the trailer bolt, and
when the hand crank drive socket is decoupled from the trailer bolt, the trailer bolt is configured to rotate relative to the stationary hand crank drive socket;
a handheld motorized power tool having a rotating drive bolt adapted for coupling to and rotating the trailer bolt; and,
a stabilizing connector configured for coupling to the land vehicle, the stabilizing connector configured to receive and detachably secure the body of the motorized power tool from rotating during operation; and
a landing gear mounting bracket that is affixed to the landing gear and is adapted for attaching the stabilizing connector to the landing gear to prevent the handheld motorized power tool from rotating during operation; and
further comprising a telescoping torque arm attached to the landing gear mounting bracket, wherein the stabilizing connector comprises a power tool engagement bracket attached to the landing gear via the telescoping torque arm and the landing gear mounting bracket, and wherein the power tool engagement bracket is adapted to receiving a locking blade of the power tool.

6. The trailer landing gear lifting system for rotating the drive shaft of a landing gear of a land vehicle of claim 5, further comprising:
a swivel tie rod having a first end and a second end, the first end of the swivel tie rod is coupled to the landing gear mounting bracket, and the second end of the swivel tie rod is coupled to the telescoping torque arm.

7. The trailer landing gear lifting system for rotating the drive shaft of a landing gear of a land vehicle of claim 6, wherein the landing gear mounting bracket attaches to the landing gear via removable bolts.

8. The trailer landing gear lifting system for rotating the drive shaft of a landing gear of a land vehicle of claim 5, further comprising a swivel bearing coupling the trailer bolt to the power tool engagement bracket.

\* \* \* \* \*